United States Patent [19]

Yang

[11] Patent Number: 5,730,383
[45] Date of Patent: Mar. 24, 1998

[54] REEL TABLE BRAKING DEVICE FOR USE IN A VIDEO CASSETTE RECORDER

[75] Inventor: Chong-Tae Yang, Seoul, Rep. of Korea

[73] Assignee: Daewoo Electronics Co., Ltd., Seoul, Rep. of Korea

[21] Appl. No.: 824,374

[22] Filed: Mar. 26, 1997

[30] Foreign Application Priority Data

Mar. 28, 1996 [KR] Rep. of Korea .................. 96-8739

[51] Int. Cl.$^6$ ............................................. G11B 15/44
[52] U.S. Cl. ............................................. 242/355
[58] Field of Search ........................... 242/355, 396.6, 242/396.9, 423, 423.1; 360/74.1, 96.3, 96.4

[56] References Cited

U.S. PATENT DOCUMENTS

| | | | |
|---|---|---|---|
| 3,767,137 | 10/1973 | Richt et al. | 242/355 |
| 3,858,828 | 1/1975 | Bundschuh et al. | 242/355 |
| 4,679,745 | 7/1987 | Kim . | |
| 5,301,073 | 4/1994 | Katohno et al. | 360/96.3 |

FOREIGN PATENT DOCUMENTS

34 17 424 A1  11/1985  Germany .................. 360/96.3

*Primary Examiner*—John P. Darling
*Attorney, Agent, or Firm*—Anderson, Kill & Olick, P.C.

[57] ABSTRACT

A reel table braking device for use in a video cassette recorder having a deck and a reel table rotatably fixed on the deck through a shaft. The reel table braking device comprises a brake assembly mounted on the shaft of the reel table and movable along the shaft between the reel table and the deck, and a slide plate provided with a first and a second urging means having different height from each other. The brake assembly includes a main brake, a sub brake, and a compressive spring fitted on the periphery of the main brake. The main brake has at least one elastic hook and a bottom plate. The bottom plate protrudes from the periphery of the main brake and supports the spring. Furthermore, the sub brake has at least one hook seat corresponding to the elastic hook, is fitted on the main brake in such a way that the hook is inserted in the hook seat, and is biased upwardly by the spring. The slide plate is movably disposed under the reel table so that the first and the second urging means selectively urge the brake assembly upwardly, thereby allowing the sub and main brakes to come in contact with the reel table, respectively.

5 Claims, 3 Drawing Sheets

5,730,383

1

REEL TABLE BRAKING DEVICE FOR USE IN A VIDEO CASSETTE RECORDER

FIELD OF THE INVENTION

The present invention relates to a reel table braking device for use in a video cassette recorder ("VCR"); and, more particularly, to a reel table braking device which can be easily assembled in the VCR.

DESCRIPTION OF THE PRIOR ART

There is shown in FIG. 1 a conventional brake mechanism for braking a reel table at the conversion of the operating mode at a given time. The conventional brake mechanism comprises a main and sub brakes 6, 8 rotatably mounted on a deck (not shown) through a first and a second hinge pins 7, 20, respectively, a slide plate 10 for selectively actuating the main and the sub brakes 6, 8. The main and the sub brakes 6, 8 are disposed adjacent to the reel table 4, being biased by tensile springs 16, 26 toward the reel table 4, respectively.

The slide plate 10 has at its lateral edge a recess 14 into which a downwardly protruding post 12 of the main brake 6 is fitted and an elongated slot 18 into which the hinge pin 20 of the sub brake 8 is inserted to guide the longitudinal movement of the slide plate 10. The elongated slot 18 of the slide plate 10 has a camming surface 28 engaged with a cam follower pin 24 of the sub brake 8. As the slide plate 10 moves in the longitudinal direction as indicated by the arrows, the main and the sub brakes 6, 8 selectively come in contact with the reel table 4.

However, in such a conventional reel table braking mechanism, the main and the sub brakes are distinctly assembled to the deck, thereby complicating the assembling process, resulting in a poor productivity. Furthermore, the main and the sub brakes occupy a large space on the deck, which, in turn, restricts the design of the other components on the deck.

SUMMARY OF THE INVENTION

It is, therefore, a primary object of the invention to provide a reel table braking device for use in a VCR, which is capable of being assembled therein with ease.

In accordance with an aspect of the present invention, there is provided a reel table braking device for use in a video cassette recorder having a deck and a reel table rotatably fixed on the deck through a shaft, the reel table braking device comprising: a brake assembly mounted on the shaft of the reel table and movable along the shaft between the reel table and the deck, the brake assembly including a main brake, a sub brake, and a spring fitted on the periphery of the main brake, wherein the main brake has at least one elastic hook and a bottom plate, the bottom plate protruding from the periphery of the main brake and supporting the spring, and the sub brake has at least one hook seat corresponding to the elastic hook, the sub brake being fitted on the main brake in such a way that the hook is inserted in the recess and being biased upwardly by the spring; and a slide plate provided with a first and a second urging means having different height from each other, the slide plate being movably disposed under the reel table so that the first and the second urging means selectively urge the brake assembly upwardly, thereby allowing the sub and main brakes to come in contact with the reel table, respectively.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
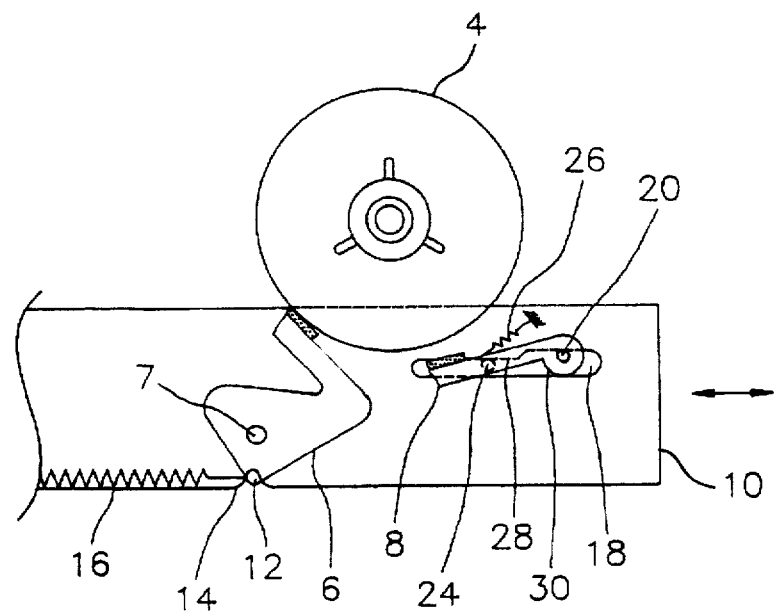
FIG. 1 shows a schematic top view of a conventional reel table braking device.

There are shown in FIGS. 2 to 6 various views of a reel table braking device, for use in a VCR having a deck 110 and a reel table 120 rotatably mounted on a shaft 121 fixed to the deck 110, in accordance with a preferred embodiment of the present invention.

The reel table braking device of the present invention comprises a brake assembly 100 including a cylindrical main brake 130, an annular sub brake 140, and a compressive spring 137 fitted on the periphery of the main brake 130, and a slide plate 150 provided with a first and a second urging means 151, 152 having different height from each other.

The main brake 130 has at least one, e.g., two elastic hooks 135 disposed 180° from each other and a bottom plate 131 with a central boss 132. The bottom plate 131 outwardly radially protrudes from the periphery of the main brake 130, supporting the spring 137 and preventing it from deviating from the main brake 130.

The sub brake 140 has an annular felt 141 attached on top thereof and at least one, e.g., two hook seats or apertures 142 corresponding to the elastic hooks 135. The sub brake 140 is fitted on the main brake 130 in such a way that the hooks 135 are inserted in the recesses 142, respectively, being biased upwardly by the spring 137.

The brake assembly 100 is mounted on the shaft 121 of the reel table 120 through the central boss 132 and is movable along the shaft 121 between the reel table 120 and the deck 110. The shaft 121 is provided with an axial guide groove 122 and the main brake is provided with a protuberance 133 projecting inwardly from the inner surface of the central boss 132, the protuberance being fitted in the groove 122, thereby preventing the brake assembly 100 from rotating together with the reel table 120 when the former comes in contact with the latter.

The slide plate 150 is disposed under the deck 110 and is moved in the longitudinal directions as indicated by the arrows by a driving system (not shown) at the conversion of the operation mode of the VCR. In case that the first and the second urging means 151, 152 move and urge the brake assembly 100 upwardly, the sub and main brake 140, 130 contact and exert an brake force on a lower and an upper bottom surfaces 123, 124 of the reel table, respectively.

Operation of the reel table braking device of the present invention will now be described.

Figure 2:
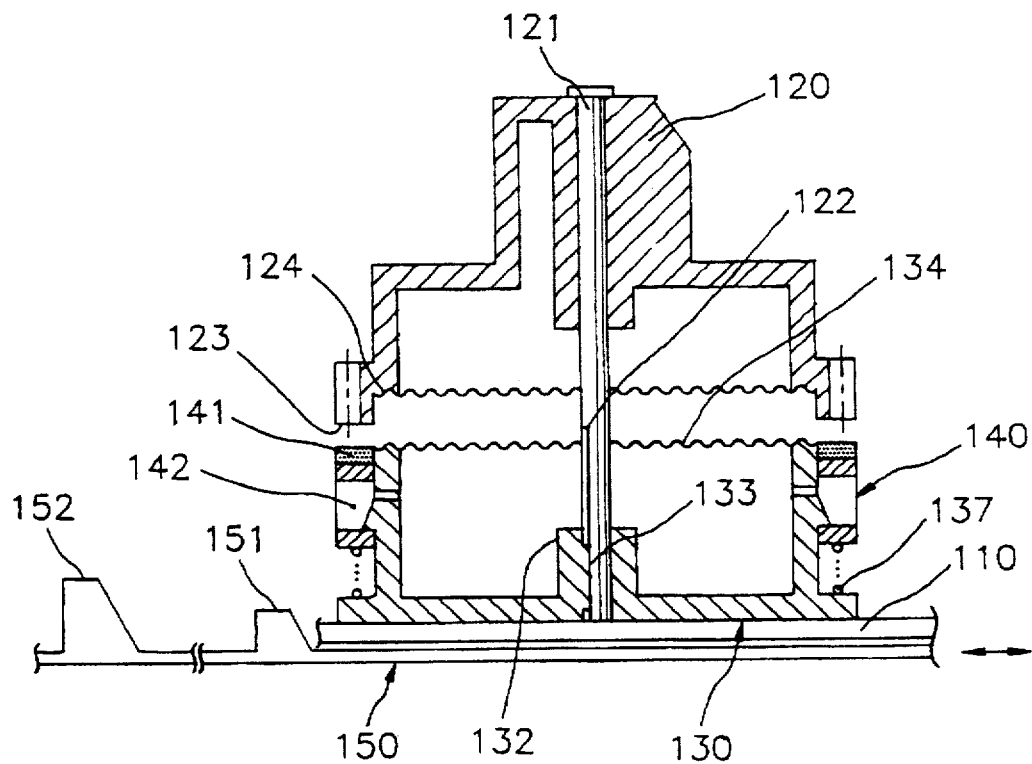
FIG. 2 illustrates a cross sectional view of a reel table braking device in accordance with a preferred embodiment of the present invention.
Figure 3:
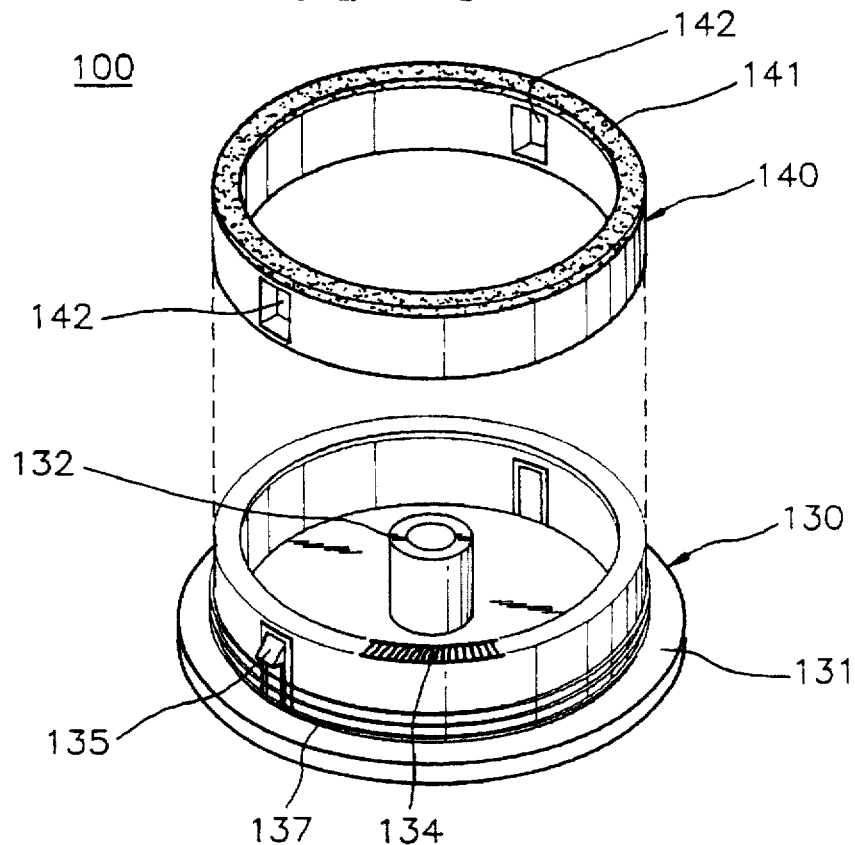
FIG. 3 presents an exploded view of the main and the sub brakes in FIG. 2.
Figure 4:
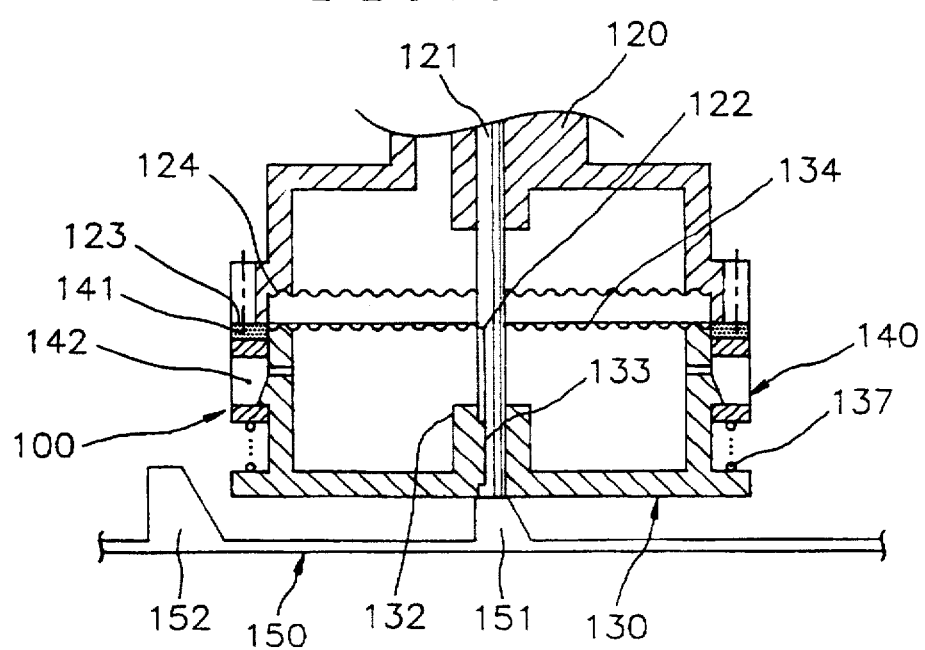
FIG. 4 depicts a cross sectional view of the reel table braking device of the present invention, showing the state that the first urging means urges the brake assembly.
Figure 5:
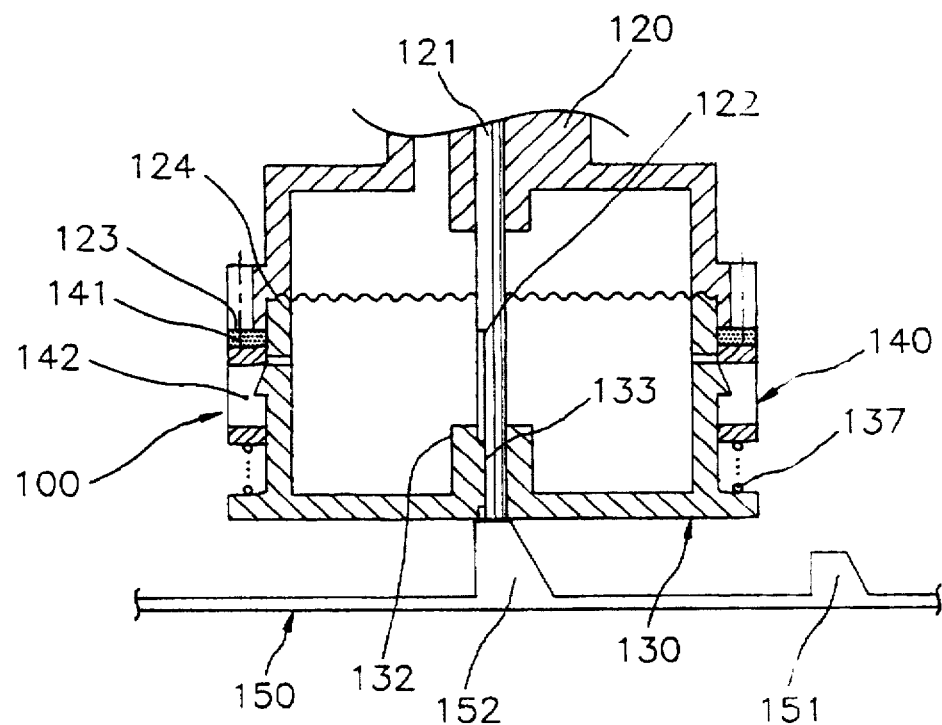
FIG. 5 depicts a cross sectional view of the reel table braking device of the present invention, showing the second urging means urges the brake assembly.

First, in a play mode, the urging means 151, 152 are separated from the brake assembly 100 so that neither the main brake 130 nor the sub brake 140 comes in contact with the reel table 120, as shown in FIG. 2. In a fast forward or a rewind mode, the slide plate 150 moves such that only the first urging means 151 contacts and urges the brake assembly 100 upwardly, thereby allowing only the sub brake 140 to come in contact with the lower bottom surface 123 of the reel table 120, as shown in FIG. 4. On the other hand, at conversion of the operation mode to stop, the slide plate 150 moves such that the second urging portion 152 contacts and urges the brake assembly 100 upwardly, thereby allowing both a top surface 134 of the main brake 130 and the sub brake 140 to come in contact with the upper and the lower bottom surfaces 124, 123 of the reel table 120, respectively, as shown in FIG. 5.

Figure 6:
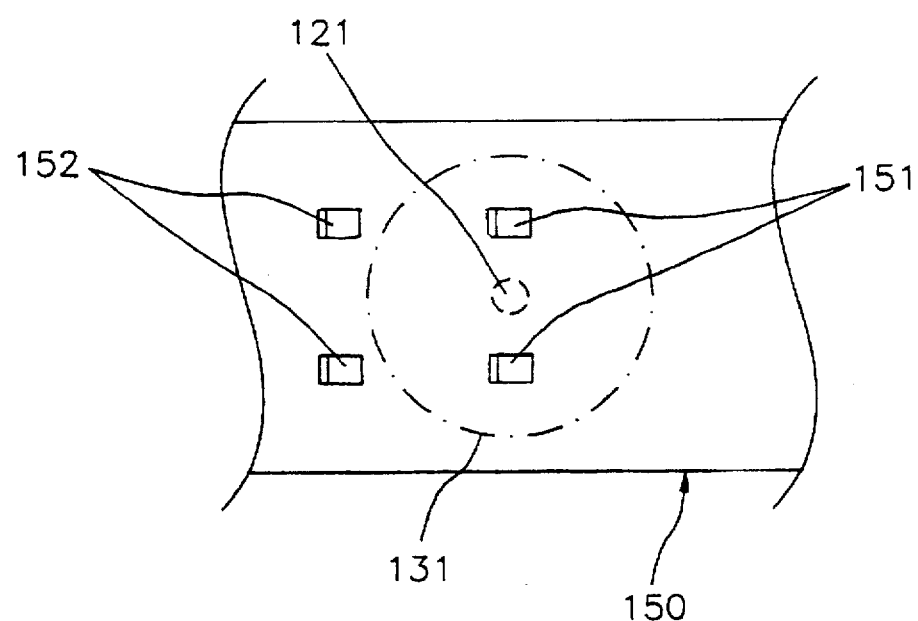
FIG. 6 sets forth a top plan view of the slide plate of the reel table braking device of the present invention.

In order to exert an uniform force on the bottom surfaces 123, 124 of the reel table 120, it is preferable that the first and the second urging means 151, 152 be each comprised of a pair of protrusions and be separated at a distance from each other, as shown in FIG. 6.

Furthermore, it is preferable that the upper bottom surface 124 of the reel table 120 and the top surface 134 of the main brake 130 be provided with complementary serration so as to increase the braking efficiency between the reel table 120 and the main brake 130.

Although the invention has been shown and described with respect to the preferred embodiments, it will be understood by those skilled in the art that various changes and modifications may be made without departing from the spirit and scope of the invention as defined in the following claims.

What is claimed is:

1. A reel table braking device for use in a video cassette recorder having a deck and a reel table rotatably fixed on the deck through a shaft, the reel table braking device comprising:

a brake assembly mounted on the shaft of the reel table and movable along the shaft between the reel table and the deck, the brake assembly including a main brake, a sub brake, and a spring fitted on the periphery of the main brake, wherein the main brake has at least one elastic hook and a bottom plate, the bottom plate protruding from the periphery of the main brake and supporting the spring, and the sub brake has at least one hook seat corresponding to the elastic hook, the sub brake being fitted on the main brake in such a way that the hook is inserted in the hook seat and being biased upwardly by the spring; and a slide plate provided with a first and a second urging means having different height from each other, the slide plate being movably disposed under the reel table so that the first and the second urging means selectively urge the brake assembly upwardly, thereby allowing the sub and main brakes to come in contact with the reel table, respectively.

2. The device of claim 1, wherein the sub brake is provided with a felt attached on top thereof.

3. The device of claim 1, wherein the reel table has an upper and a lower bottom surfaces, and the upper bottom surface of the reel table and a top surface of the main brake are provided with complementary serration.

4. The device of claim 1, wherein the first and the second urging means are each comprised of a pair of protrusions and are separated at a distance from each other.

5. The device of claim 1, wherein the shaft is provided with an axial guide groove and the main brake is provided with a protuberance projecting from the inner surface of a central boss of the bottom plate which fits on the shaft, the protuberance being fitted in and movable along the groove.

* * * * *